US008833728B2

(12) United States Patent
Kim et al.

(10) Patent No.: US 8,833,728 B2
(45) Date of Patent: Sep. 16, 2014

(54) SOLENOID VALVE FOR BRAKE SYSTEM

(71) Applicant: Mando Corporation, Gyeonggi-do (KR)

(72) Inventors: Hyun Jun Kim, Gyeonggi-do (KR); I Jin Yang, Gyeonggi-do (KR); Yong Kap Kim, Gyeonggi-do (KR); Dong Yo Ryu, Seoul (KR); Jong Young Park, Seoul (KR)

(73) Assignee: Mando Corporation, Gyeonggi-Do (KR)

( * ) Notice: Subject to any disclaimer, the term of this patent is extended or adjusted under 35 U.S.C. 154(b) by 0 days.

(21) Appl. No.: 13/667,626

(22) Filed: Nov. 2, 2012

(65) Prior Publication Data

US 2013/0105715 A1    May 2, 2013

(30) Foreign Application Priority Data

Nov. 2, 2011    (KR) .................... 10-2011-0113119

(51) Int. Cl.
   *F16K 31/02*    (2006.01)
   *B60T 8/36*     (2006.01)
   *F16K 31/06*    (2006.01)

(52) U.S. Cl.
   CPC ............ *B60T 8/363* (2013.01); *F16K 31/0693* (2013.01); *F16K 31/0665* (2013.01)
   USPC .................................. 251/129.07; 251/129.15

(58) Field of Classification Search
   USPC ........... 251/129.07, 129.15; 303/119.1, 119.2
   See application file for complete search history.

(56) References Cited

U.S. PATENT DOCUMENTS

| 3,463,443 | A  | * | 8/1969  | Churchill ........................ 251/70 |
| 6,588,857 | B2 |   | 7/2003  | Sim |
| 6,663,194 | B2 | * | 12/2003 | Cheong ...................... 303/117.1 |
| 6,755,390 | B2 | * | 6/2004  | Masuda et al. ............. 251/30.03 |
| 6,899,313 | B2 | * | 5/2005  | Carrillo et al. ........... 251/129.08 |

(Continued)

FOREIGN PATENT DOCUMENTS

| DE | 10047399 | 4/2004 |
| DE | 60200582 | 6/2005 |

(Continued)

OTHER PUBLICATIONS

German Office Action dated Feb. 11, 2014 corresponding to German Application No. 10 2012 021 715.3; 8 pages.

*Primary Examiner* — Eric Keasel
*Assistant Examiner* — Matthew W Jellett
(74) *Attorney, Agent, or Firm* — Ohlandt Greeley Ruggiero & Perle L.LP.

(57) ABSTRACT

Disclosed is a solenoid valve for a brake system which improves an assembly structure of components configuring the valve to enhance durability and control performance of the valve.
The solenoid valve for a brake system includes a seat housing installed at a bore of a modulator block and provided with a through hole formed therethrough, a valve seat installed at the through hole of the seat housing and provided with an orifice, a sleeve provided with a hollow and connected to the seat housing, a magnetic core, an armature installed at the sleeve, and a return spring installed in the sleeve, wherein the armature includes an upper armature formed of a magnetic material, and a lower armature formed of a non-magnetic material, wherein the through hole of the seat housing is provided with a guide region having a diameter corresponding to an outer diameter of the lower armature.

4 Claims, 5 Drawing Sheets

(56) References Cited

U.S. PATENT DOCUMENTS

| | | | |
|---|---|---|---|
| 7,299,904 B2 * | 11/2007 | Wagu et al. | 303/113.2 |
| 7,722,133 B2 * | 5/2010 | Suzuki et al. | 303/119.2 |
| 8,141,959 B2 * | 3/2012 | Ota | 303/3 |
| 2008/0185548 A1 * | 8/2008 | Takahashi et al. | 251/129.15 |
| 2010/0213758 A1 * | 8/2010 | Nanahara | 303/20 |
| 2012/0001109 A1 * | 1/2012 | Nanahara et al. | 251/129.15 |
| 2012/0199772 A1 * | 8/2012 | Kim et al. | 251/129.15 |
| 2013/0153801 A1 * | 6/2013 | Sato et al. | 251/129.21 |

FOREIGN PATENT DOCUMENTS

| | | |
|---|---|---|
| DE | 102008014408 | 4/2009 |
| DE | 102012001696 | 8/2012 |
| JP | 2006194324 | 7/2006 |
| JP | 2011047483 | 3/2011 |
| KR | 100673058 | 1/2007 |
| KR | 1020120088903 | 8/2012 |
| WO | 2004055420 | 7/2004 |

* cited by examiner

SOLENOID VALVE FOR BRAKE SYSTEM

CROSS-REFERENCE TO RELATED APPLICATION(S)

This application claims the benefit of Korean Patent Application No. P2011-113119, filed on Nov. 2, 2011 in the Korean Intellectual Property Office, the disclosure of which is incorporated herein by reference.

BACKGROUND

1. Field

Embodiments of the present invention relate to a solenoid valve for a brake system which improves an assembly structure of components configuring the valve to enhance durability and control performance of the valve.

2. Description of the Related Art

In general, a hydraulic brake of a vehicle performs braking operation by applying hydraulic pressure to a master cylinder through operation of a brake pedal. Here, if braking force applied to the tires exceeds static frictional force between a road surface and the tires, tire slippage occurs on the road surface.

However, a coefficient of kinetic friction is smaller than a coefficient of static friction, and thus in order to achieve optimal braking, such slippage needs to be prevented, and steering wheel lock causing an uncontrollable steering wheel needs to be prevented.

Therefore, an anti-lock brake system (ABS), which controls hydraulic pressure applied to a master cylinder to prevent tire slippage, has been proposed. The ABS basically includes a plurality of solenoid valves, an electronic control unit (ECU) to control the solenoid valves, an accumulator and a hydraulic pump.

These solenoid valves are classified into a Normally Open type, the valves of which are disposed upstream of the hydraulic brake and kept open at normal times, and a Normally Closed type, the valves of which are disposed downstream of the hydraulic brake and kept closed at normal times.

FIG. 1 is a sectional view illustrating a conventional solenoid valve of the Normally Closed type. Such a solenoid valve 10 is press-fit into a bore 15 of a modulator block 11 provided with fluid passages of a brake system, and includes a hollow seat housing 1 having an inlet 3 and an outlet 4 communicating with an inflow passage 13 and an outflow passage 14 of the modulator block 11 to enable a fluid to flow.

The seat housing 1 is hollowed inside to communicate with the inlet 3 and the outlet 4, and a valve seat 8 having an orifice 8a formed at an upper portion thereof is press-fitted into the seat housing 1.

Further, a cylindrical sleeve 6 is connected to the seat housing 1 at the upper side of the seat housing 1 such that an armature 5 installed at the seat housing 1 may move forward and backward, and a magnetic core 7 is connected to an open end of the sleeve 6 to close the open end of the sleeve 6 and move the armature 5 forward and backward.

The armature 5, which is formed of a magnetic material, moves forward and backward to open and close the orifice 8a of the valve seat 8 installed at the seat housing 1. To this end, the armature 5 is provided with an opening and closing part 5a extending toward the valve seat 8 through a through hole 2 of the seat housing 1.

A return spring 9 pressing the armature 5 is installed between the armature 5 and the magnetic core 7 so that the orifice 8a is closed by the armature 5 at normal times, and an exciting coil assembly (not shown) moving the armature 5 forward and backward is installed at outer sides of the sleeve 6 and the magnetic core 7.

In such a solenoid valve 10, when power is applied to the exciting coil assembly, magnetic force is formed between the magnetic core 7 and the armature 5 and the armature 5 is moved toward the magnetic core 7 by the magnetic force to open the orifice 8a of the valve seat 8. On the other hand, when power applied to the exciting coil assembly is interrupted, magnetic force is removed and the armature 5 is returned to its original position by elasticity of the return spring 9, thus closing the orifice 8a.

When a magnetic field is generated in such a manner, the armature 5 opens the orifice 8a of the valve seat 8, moving toward the magnetic coil 7. When power is not applied to the exciting coil assembly, no magnetic field is generated and thus the armature 5 is operated by the elasticity of the return spring 9 to close the orifice 8a.

The above-described solenoid valve 10 is configured to guide movement of the armature 5 using a space G between the armature 5 and the sleeve 6 when the armature 5 is operated. That is, the armature 5 moves under guidance of the sleeve 6.

Such a solenoid valve 10 needs to have operational durability due to frequent braking. In order to ensure operational durability, shaking of the armature 5 needs to be prevented when the armature 5 contacts the valve seat 8. In order to minimize such shaking, movement of the armature 5 needs to be stably guided in a region closed to the valve seat 8.

However, in the conventional solenoid valve 10, movement of the armature 5 is guided only by the space G between the armature 5 and the sleeve 6. That is, as shown in FIG. 1, since a gap S between the opening and closing part 5a formed at the lower end of the armature 5 and the seat housing 1 is relatively large, the armature 5 may not be stably guided and thus shaking of the armature 5 may occur.

Accordingly, the gap S between the armature 5 and the seat housing 1 is reduced to stably guide the armature 5. However, in this case, when power is applied to the exciting coil assembly, the reduced gap S between the armature 5 and the seat housing 1, through which a stream of magnetic force is generated, may greatly degrade responsiveness and control linearity of the solenoid valve 10 in variation of magnetic force with applied current. That is, as shown in FIG. 2, as magnetic force varies nonlinearly with current, responsiveness and control linearity of the solenoid valve 10 are low.

In addition, if the gap between the armature 5 and the seat housing 1 is reduced, responsiveness and control linearity of the solenoid valve 10 may be degraded due to frictional force encountered when the armature 5 slides.

SUMMARY

Therefore, it is an aspect of the present invention to provide a solenoid valve for a brake system which has a reduced gap between an armature and a seat housing to stably move the armature without shaking to improve operational durability and ensure responsiveness and control linearity of the solenoid valve.

It is another aspect of the present invention to provide a solenoid valve for a brake system which reduces frictional force between an armature and a seat housing so that responsiveness of the solenoid valve may be improved.

Additional aspects of the invention will be set forth in part in the description which follows and, in part, will be obvious from the description, or may be learned from practice of the invention.

In accordance with one aspect of the present invention, a solenoid valve for a brake system includes a seat housing installed at a bore of a modulator block and provided with a through hole formed therethrough in a longitudinal direction, a valve seat installed at the through hole of the seat housing and provided with an orifice, a sleeve provided with a hollow formed therein and connected to the seat housing to surround an outer surface of an upper portion of the seat housing, a magnetic core to seal an upper portion of the sleeve, an armature installed at the sleeve to be movable forward and backward, and a return spring installed in the sleeve to press the armature toward the valve seat, wherein the armature includes an upper armature formed of a magnetic material and guided within the sleeve to be movable forward and backward and a lower armature formed of a non-magnetic material, provided with an opening and closing part to open and close the orifice, and guided within the seat housing to be movable forward and backward, wherein the through hole of the seat housing is provided with a guide region which has a diameter corresponding to an outer diameter of the lower armature such that a portion of the through hole guides the lower armature in the longitudinal direction.

An expanded portion expanded to have a diameter larger than the diameter of the guide region is formed at the inlet of the through hole into which the lower armature is inserted toward an upper portion of the guide region.

Further, the through hole is provided with a concave groove on the inner surface thereof at the lower side of the guide region.

The upper armature may be provided with a coupling groove formed by grooving a portion of the lower surface of the upper armature in the longitudinal direction, and the lower armature may be provided with a coupling protrusion extending from the upper surface thereof to be press-fitted into the coupling groove such that the upper armature and the lower armature move together.

At least one slot-shaped oil passage through which oil may flow in the vertical direction may be formed along the outer surface of the lower armature.

Symmetrically arranged stepped parts may be provided respectively on the upper surface of the upper armature and the lower surface of the magnetic core such that the stepped parts of the upper armature are engaged with the stepped parts of the magnetic core.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
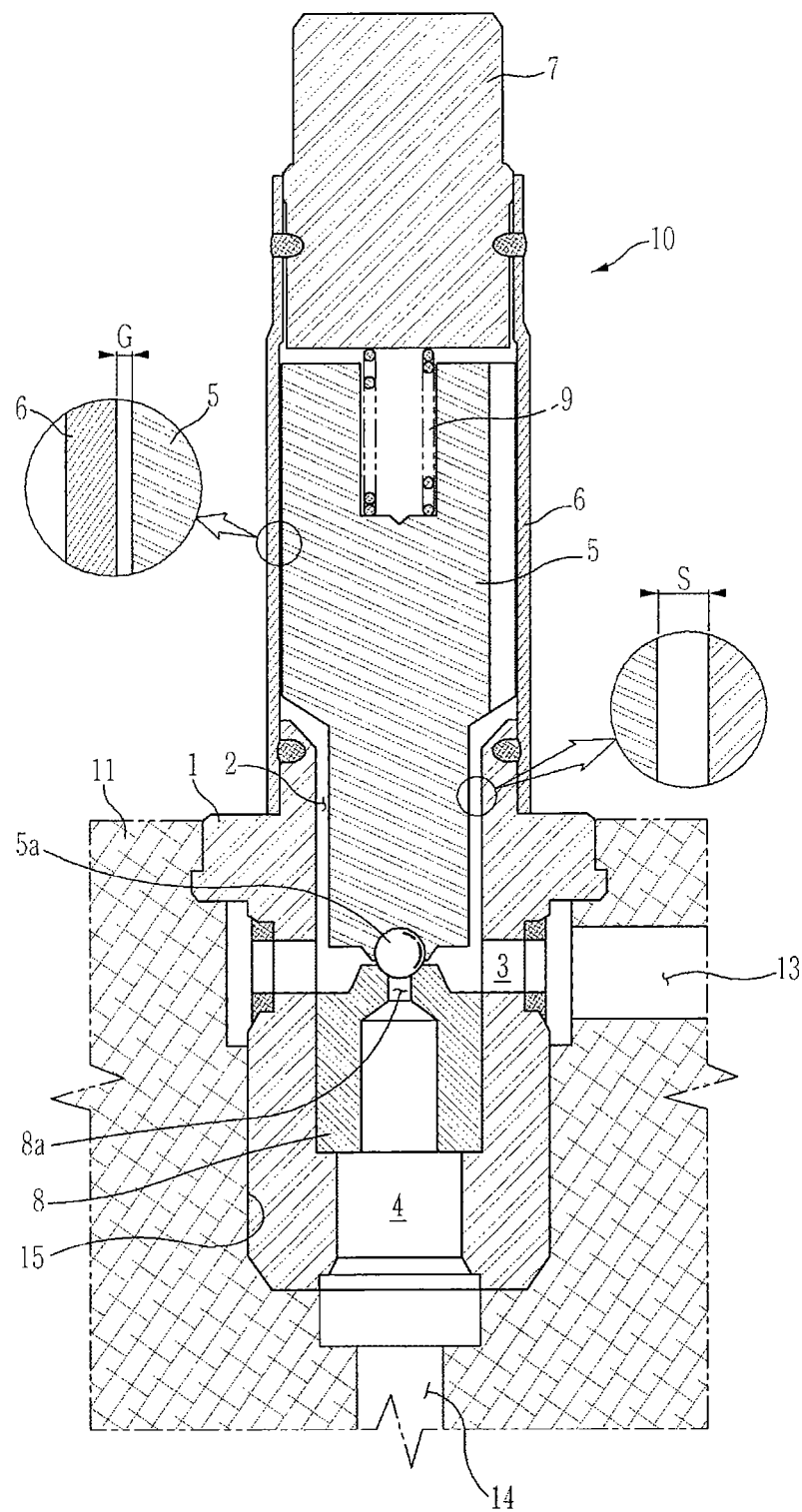
FIG. 1 is a sectional view illustrating a conventional solenoid valve.
Figure 2:
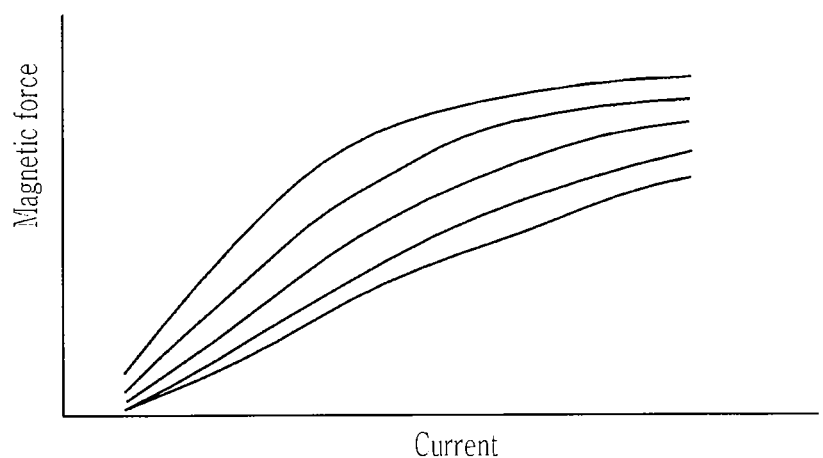
FIG. 2 is a graph illustrating variation of magnetic force in the conventional solenoid valve with current.

Reference will now be made in detail to the embodiments of the present invention, examples of which are illustrated in the accompanying drawings, wherein like reference numerals refer to like elements throughout. It should be understood that the terms used in the specification and appended claims should not be construed as limited to general and dictionary meanings but should be construed based on the meanings and concepts according to the spirit of the present invention on the basis of the principle that the inventor is permitted to define appropriate terms for best explanation. The embodiments described in the specification and shown in the drawings are purely illustrative and are not intended to represent all aspects of the invention, such that various equivalents and modifications may be made without departing from the spirit of the invention.

Figure 3:
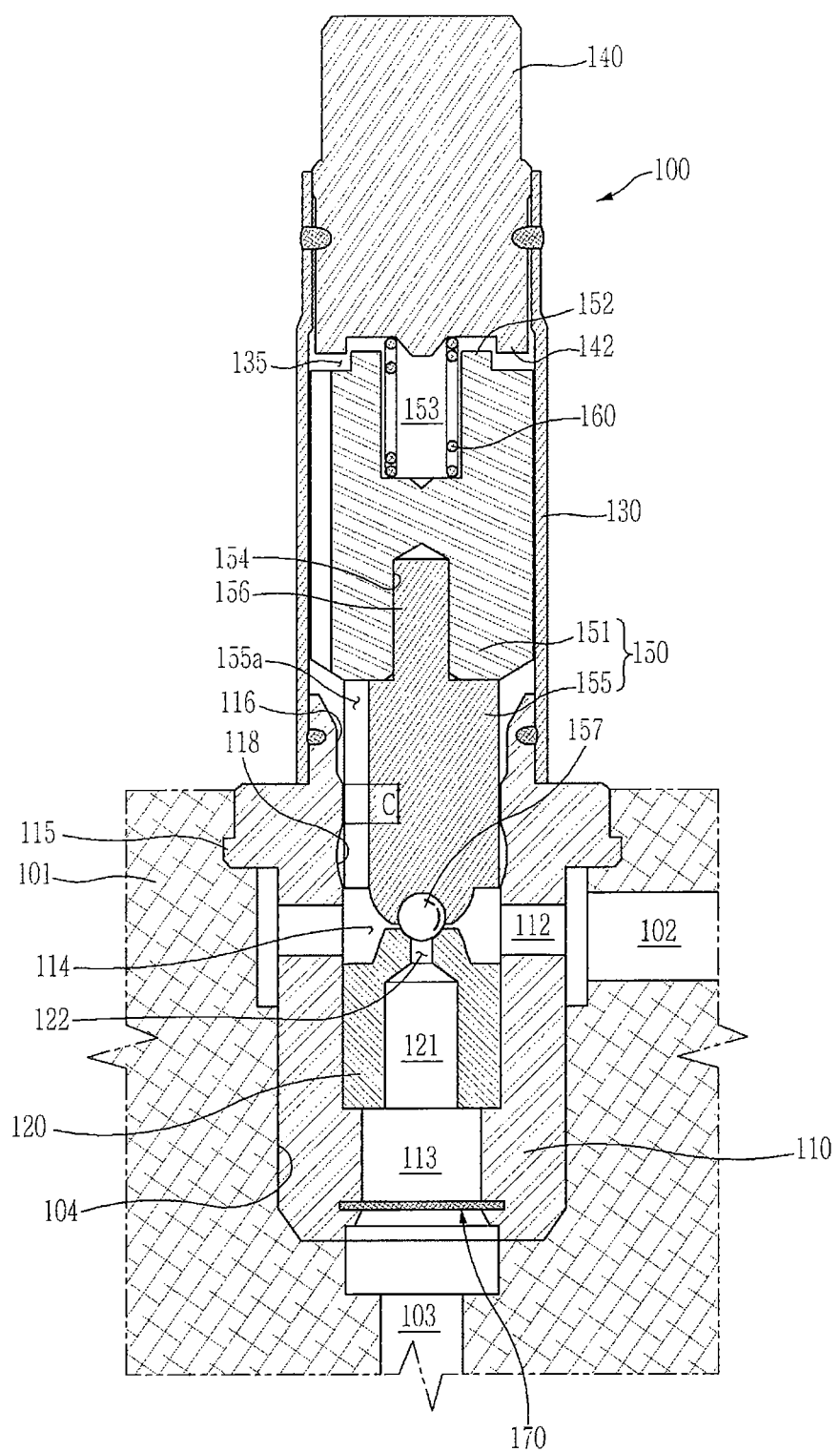
FIG. 3 is a sectional view illustrating a solenoid valve for a brake system in accordance with an embodiment of the present invention.

FIG. 3 is a sectional view illustrating a solenoid valve for a brake system in accordance with an embodiment of the present invention.

With reference to FIG. 3, a solenoid valve 100 for a brake system in accordance with the present embodiment includes a seat housing 110 inserted into a modulator block 101, a valve seat 120 installed at the seat housing 110, a sleeve 130 connected at one end to the seat housing 110, a magnetic core 140 connected to the other end of the sleeve 130 opposite to the seat housing 110, an armature 150 moving forward and backward within the sleeve 130, and a return spring 160 installed in the sleeve 130.

The seat housing 110 has a cylindrical shape, and is provided with a through hole 114 formed through the center thereof in the longitudinal direction. Provided on the outer surface of the seat housing 110 is a flange 115 to fix the seat housing 110 to an inlet of a bore 104 of the modulator block 101. The flange 115 is fixed by deformation of the modulator block 101 when the valve 100 is installed.

The seat housing 110 is further provided with an inlet 112 and an outlet 113 respectively communicating with an inflow passage 102 and an outflow passage 103 formed on the modulator block 101 through which oil is introduced into and discharged from the seat housing 110, in addition to the through hole 114.

According to the present embodiment, the through hole 114 of the seat housing 110 is provided, at a portion of the through hole 114, with a guide region C arranged in the longitudinal direction to have a diameter corresponding to the outer diameter of a lower armature 155, which will be described below, and has an expanded portion 116 formed at the upper side of the guide region C at the inlet of the through hole 114, into which the lower armature 155 is inserted, to have an expanded diameter, and a concave groove 118 formed on a portion of the inner surface of the through hole 114 at the lower side of the guide region C. The structure of the through hole 114 of the seat housing 110 will be described below.

The valve seat 120 is press-fitted into the through hole 114 of the seat housing 110 and fixed. The valve seat 120 is provided with an inner passage 121 passing through the valve seat 120 in a longitudinal direction and an orifice 122 formed at an upper portion of the inner passage 121 to open and close the inner passage 121.

The sleeve 130 has a cylindrical shape such that the armature 150 installed at a hollow 135 of the sleeve 130 may move forward and backward, and upper and lower portions of the sleeve 130 are open. The open lower portion of the sleeve 130 is press-fitted to the outer surface of the upper portion of the seat housing 110. Such a sleeve 130 may be fixed to the seat housing 110 through welding, etc.

Connected to the open upper portion of the sleeve 130 is the magnetic core 140 which closes the open upper portion of the sleeve 130 and generates electromagnetic force to move the armature 150 forward and backward. To generate electromagnetic force, an exciting coil assembly (not shown) generating a magnetic field by application of power is installed on the outer surfaces of the magnetic core 140 and the sleeve 130. When power is applied to the exciting coil assembly, the armature 150 moves toward the magnetic core 140.

A return spring 160 is installed between the armature 150 and the magnetic core 140, such that when power applied to the exciting coil assembly is interrupted, the armature 150 is returned to its original position to close the orifice 122 of the valve seat 120.

The return spring 160 is inserted into a spring insertion groove 153 formed on an upper portion of the armature 150 to press the armature 150.

In accordance with the embodiment of the present invention, the armature 150 opens and closes the orifice 122 of the valve seat 120 through forward and backward movement, as described above. In more detail, the armature 150 includes an upper armature 151 provided within the sleeve 130 to move forward and backward, and a lower armature 155 inserted into the through hole 114 of the seat housing 110 to move forward and backward.

The upper armature 151 is formed of a magnetic material, and has an outer diameter corresponding to the inner diameter of the sleeve 130 so as to be guided within the hollow 135 of the sleeve 130.

The lower armature 155 is formed of a non-magnetic material, and guided within the seat housing 110 to move forward and backward. As described above, since the guide region C formed at the through hole 114 of the sheet housing 110 has a diameter corresponding to the outer diameter of the lower armature 155, the lower armature 155 may be guided by the guide region C to stably move without shaking. Further, the through hole 114 of the seat housing 110 is provided with the expanded portion 116 formed at the upper side of the guide region C to have an expanded diameter and the groove 118 formed at the lower side of the guide region C to have a concave inner surface, and therefore frictional force created by sliding movement of the lower armature 155 may be minimized and responsiveness of the solenoid valve 100 may be improved.

In addition, a spherical opening and closing part 157 is provided at the lower end of the lower armature 155 to open and close the orifice 122, and a slot-shaped oil passage 155*a* is formed at the outer surface of the lower armature 155 to allow oil to flow therethrough in the vertical direction such that the armature 150 moves smoothly.

Since the lower armature 155 in accordance with the embodiment of the present invention is formed of a non-magnetic material, degradation of responsiveness of the solenoid valve 100 that may be caused by the narrowed gap with the seat housing 110 may be avoided.

Further, as the upper armature 151 is guided and moved within the sleeve 130 and the lower armature 155 is guided and moved within the seat housing 110, the armature 150 is stably moved without shaking and thus operational durability is improved.

The lower armature 155 is press-fitted into the upper armature 151 to move together with the upper armature 151. That is, as shown in FIG. 3, a coupling groove 154 is provided on the lower surface of the upper armature 151 by grooving a portion of the lower surface of the upper armature 151 in the longitudinal direction, and a coupling protrusion 156 is provided on the upper surface of the lower armature 155 to extend from the upper surface of the lower armature 155 to be coupled with the coupling groove 154. Thus, as the coupling protrusion 156 is press-fitted into the coupling groove 154, the upper armature 151 and the lower armature 155 move together.

Further, symmetrical stepped parts 152 and 142 are respectively provided on the upper surface of the upper armature 151 and the lower surface of the magnetic core 140 to define a distance of forward and backward movement of the armature 150 when the armature 150 is moved by a magnetic field. That is, the stepped parts 152 on the upper surface of the upper armature 151 and the stepped parts 142 on the lower surface of the magnetic core 140 are formed to engage with each other.

Additionally, as shown in FIG. 3, a filter member 170 is installed at the outlet 113 of the seat housing 110 so as to filter out impurities from oil to be discharged to the outflow passage 103 of the modulator block 101. Although the filter member 170 is shown as being installed at the outlet 113 of the seat housing 110, the position of the filter member 170 is not limited thereto. The filter member 170 may be installed at the inlet 112 of the seat housing 110 so as to filter out impurities from oil introduced through the inflow passage 102 of the modulator block 101.

Hereinafter, operation of the above-described solenoid valve 100 will be described.

Figure 4:
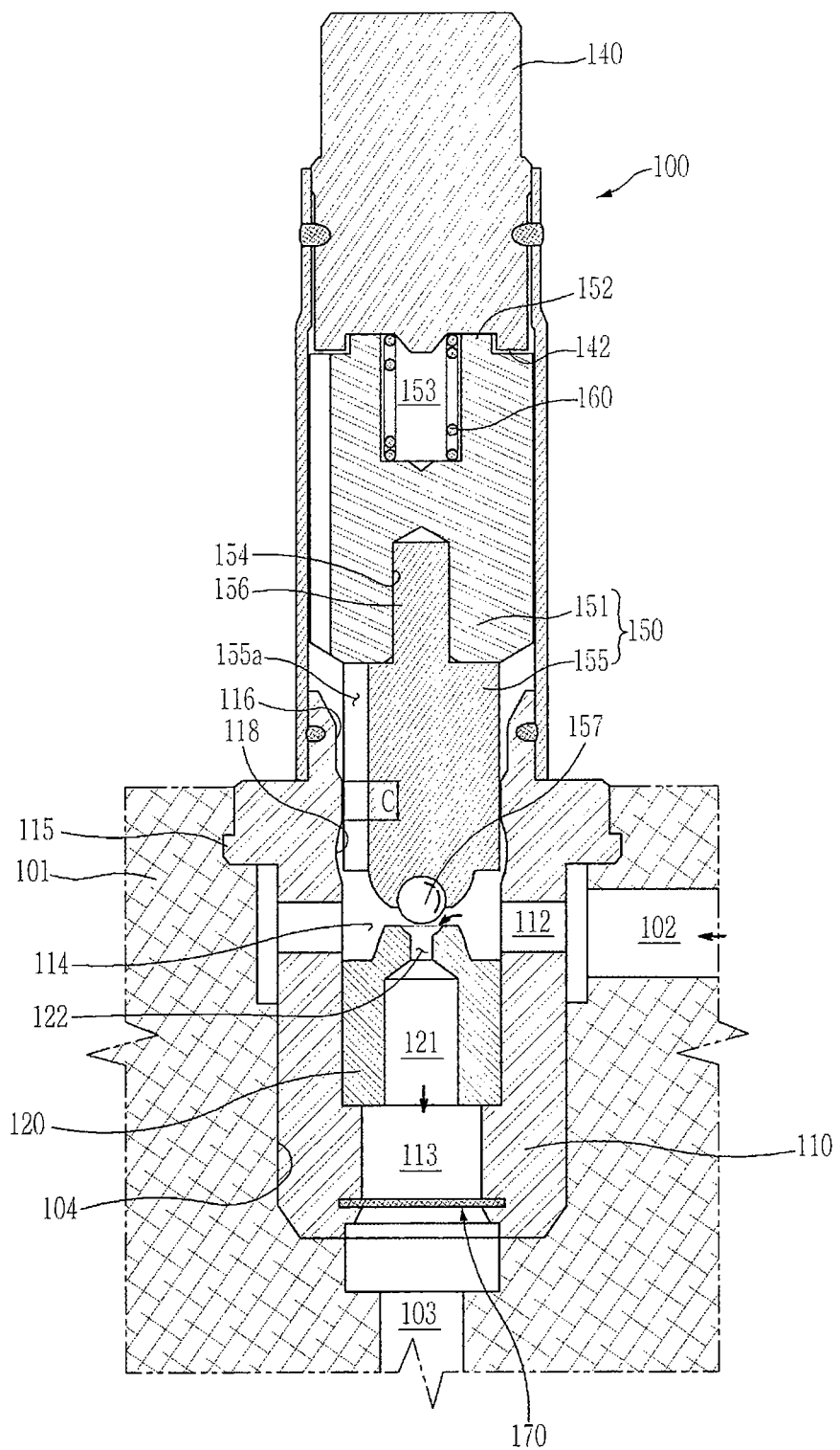
FIG. 4 is a sectional view illustrating the solenoid valve for a brake system in accordance with the illustrated embodiment of the present invention in which an orifice is opened.

When power is applied to the exciting coil assembly (not shown) provided on the outer surfaces of the magnetic core 140 and the sleeve 130, a magnetic field is formed and the upper armature 151 moves upward against the elastic force of the return spring 160. At this time, the lower armature 155 positioned at the lower side of the upper armature 151 and press-fitted into the upper armature 151 moves upward together with the upper armature 151. That is, as shown in FIG. 4, the lower armature 155 moves upward together with the upper armature 151, and the orifice 122 is opened. Thereby, introduced oil flows from the inflow passage 102 to the outflow passage 103 via the orifice 122.

When power applied to the exciting coil assembly is interrupted, the magnetic field is removed, and the upper armature 151 and the lower armature 155 are moved downward by elastic force of the return spring 160, and thus the opening and closing part 156 formed at the lower end of the lower armature 155 closes the orifice 122 of the valve seat 120.

When such operation is carried out, movement of the upper armature 151 is stably guided by the gap between the upper armature 151 and the sleeve 130, and movement of the lower armature 155 is stably guided by the guide region provided at the through hole 114. Further, as the expanded portion 116 and the groove 118 are respectively formed at the upper side and the lower side of the guide region C so as not to contact the lower armature 155, friction is minimized.

Thereby, the armature 150 stably moves forward and backward with minimized shaking and friction, and thus improved operational durability is obtained. Further, as the lower armature 155 formed of a non-magnetic material is not influenced by magnetic field variation, the responsiveness and control linearity of the solenoid valve 100 may be ensured.

Figure 5:
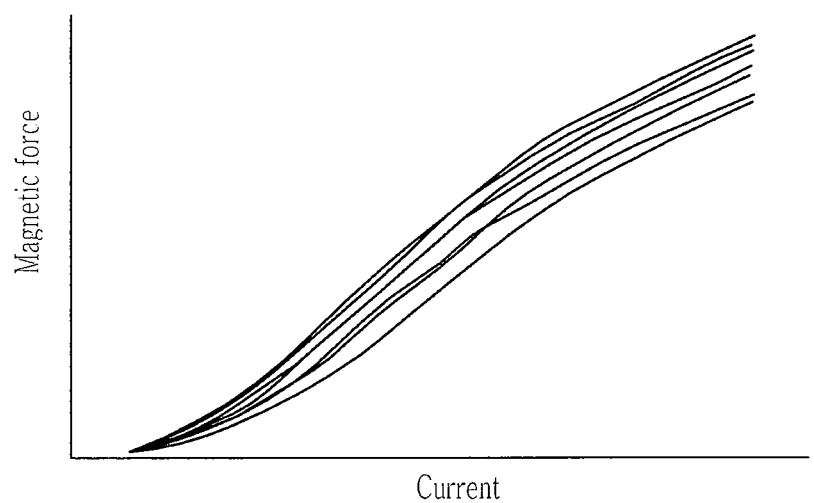
FIG. 5 is a graph illustrating variation of magnetic force with current of the solenoid valve for a brake system in accordance with the embodiment of the present invention.

Consequently, in the solenoid valve 100 in accordance with the embodiment of the present invention, as shown in FIG. 5, magnetic force varies linearly with current applied to the exciting coil assembly. As the magnetic force varies linearly, the solenoid valve 100 may be controlled more easily than the conventional solenoid valve. Further, reduction of the gap between the lower armature 155 and the seat housing 110 does not alter magnetic force, and stable performance of the solenoid valve 100 may be ensured through movement of the armature 150 with minimized shaking and frictional force.

As is apparent from the above description, it may be possible, with the solenoid valve for a brake system according to the embodiment of the present invention, to avoid degradation of responsiveness of the solenoid valve and to ensure control linearity of the solenoid valve, as the lower armature is formed of a non-magnetic material and magnetic force dose not change even if the gap between the lower armature and the seat housing is narrowed. Therefore, as the armature moves such that it contacts the valve seat with minimized shaking, operational durability of the solenoid valve may be improved.

Further, the responsiveness of the solenoid valve may be further improved as frictional force between the lower armature and the seat housing is reduced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A solenoid valve for a brake system comprising:
   a seat housing installed at a bore of a modulator block and provided with a through hole formed therethrough in a longitudinal direction;
   a valve seat installed at the through hole of the seat housing and provided with an orifice;
   a sleeve provided with a hollow formed therein and connected to the seat housing to surround an outer surface of an upper portion of the seat housing;
   a magnetic core to seal an upper portion of the sleeve;
   an armature installed at the sleeve to be movable forward and backward; and
   a return spring installed in the sleeve to press the armature toward the valve seat,
   wherein the armature includes:
   a single-piece upper armature operably connected to the return spring, formed of a magnetic material, and guided within the sleeve to be movable forward and backward; and
   a lower armature formed of a non-magnetic material, operably connected to the upper armature, provided with an opening and closing part to open and close the orifice, and guided within the seat housing to be movable forward and backward,
   wherein the upper armature comprises a coupling groove in a lower surface of the upper armature that extends in a longitudinal direction, and the lower armature comprises a coupling protrusion extending from an upper surface of the lower armature to be press-fitted into the coupling groove such that the upper armature and the lower armature move together,
   wherein the through hole of the seat housing is provided, at a portion thereof, with a guide region having a diameter corresponding to an outer diameter of the lower armature to guide the lower armature in the longitudinal direction,
   wherein the through hole of the seat housing further comprises an expanded portion at an upper side thereof at an inlet of the through hole into which the lower armature is inserted, such that a diameter of the expanded portion is larger than the diameter of the guide region, and
   wherein the through hole further comprises a concave groove on an inner surface thereof at a lower side of the of the through hole beneath the guide region, such that a diameter of the concave groove is larger than the diameter of the guide region.

2. The solenoid valve according to claim 1, wherein at least one slot-shaped oil passage through which oil flows along the longitudinal direction is formed along the outer surface of the lower armature.

3. The solenoid valve according to claim 1, wherein symmetrical stepped parts are provided respectively on an upper surface of the upper armature and a lower surface of the magnetic core, such that the stepped parts of the upper armature are engaged with the stepped parts of the magnetic core.

4. A solenoid valve for a brake system comprising:
   a seat housing installed at a bore of a modulator block and comprising a through hole formed therethrough along a longitudinal axis;
   a valve seat comprising an orifice and installed at the through hole of the seat housing;
   a hollow sleeve connected to the seat housing to surround an outer surface of an upper portion of the seat housing;
   a magnetic core that seals an upper portion of the sleeve;
   an armature installed within the sleeve, wherein the armature is movable in opposing directions along the longitudinal axis; and
   a return spring installed in the sleeve to press the armature toward the valve seat,
   wherein the armature comprises:
   an upper armature formed of a magnetic material and guided within the sleeve to be movable along the longitudinal axis; and
   a lower armature formed of a non-magnetic material, comprising an opening and closing part to open and close the orifice, wherein the lower armature is guided within the seat housing to be movable along the longitudinal axis,
   wherein the through hole of the seat housing is provided, at a portion thereof, with a guide region having a diameter corresponding to an outer diameter of the lower armature to guide the lower armature along the longitudinal axis,
   wherein the through hole of the seat housing further comprises an expanded portion at an upper side of the guide region to be expanded at the inlet of the through hole into which the lower armature is inserted, such that a diameter of the expanded portion is larger than the diameter of the guide region,
   wherein the through hole further comprises a concave groove on an inner surface thereof below the guide region, so that a diameter of the concave groove is larger than the diameter of the guide region, and
   wherein at least one slot-shaped oil passage through which oil flows along the longitudinal direction is formed along the outer surface of the lower armature.

* * * * *